United States Patent [19]

Nesiewicz et al.

[11] Patent Number: 5,296,535
[45] Date of Patent: Mar. 22, 1994

[54] REMOISTENABLE ADHESIVE COMPOSITION

[75] Inventors: Russell J. Nesiewicz, Hickory Hills; Christopher T. Fazioli, Western Springs, both of Ill.

[73] Assignee: National Starch and Chemical Investment Holding Corporation, Wilmington, Del.

[21] Appl. No.: 518,350

[22] Filed: May 3, 1990

Related U.S. Application Data

[63] Continuation-in-part of Ser. No. 439,750, Nov. 21, 1989, abandoned.

[51] Int. Cl.$^5$ .......................... C09J 1/00; C09J 11/04; C09J 11/08
[52] U.S. Cl. ...................................... 524/446; 524/53; 524/423; 524/425; 524/449; 524/451; 524/557
[58] Field of Search ................. 524/53, 446, 451, 423, 524/425, 449, 557

[56] References Cited

U.S. PATENT DOCUMENTS

| | | | |
|---|---|---|---|
| 2,850,468 | 9/1958 | Giggey | 524/53 |
| 3,200,094 | 8/1965 | Sederlund et al. | 524/25 |
| 3,272,675 | 9/1966 | Suzumura et al. | 156/292 |
| 3,298,987 | 1/1967 | Colgan et al. | 428/452 |
| 3,597,264 | 8/1971 | Sirota | 117/122 S |
| 4,008,116 | 2/1977 | Sebel | 156/328 |
| 4,495,245 | 1/1985 | Zunker | 428/403 |
| 4,575,525 | 3/1986 | Wacome et al. | 524/48 |
| 4,600,739 | 7/1986 | Krankkala | 524/48 |
| 4,678,824 | 7/1987 | Lauria | 524/48 |

Primary Examiner—Joseph L. Schofer
Assistant Examiner—R. Delmendo
Attorney, Agent, or Firm—Eugene Zagarella, Jr.

[57] ABSTRACT

This invention is for a liquid remoistenable adhesive composition having suitable high temperature and high humidity properties comprising water and a combination of a partially hydrolyzed polyvinyl alcohol and a chemically inert, non-thermoplastic, cold water insoluble, particulate additive which is compatible and dispersible with the polyvinyl alcohol and provides resistance to hygroscopic blocking and thermoplastic blocking.

10 Claims, No Drawings

REMOISTENABLE ADHESIVE COMPOSITION

This application is a continuation-in-part of application Ser. No. 439,750 filed Nov. 21, 1989, now abandoned.

BACKGROUND OF THE INVENTION

This invention relates to a liquid remoistenable adhesive composition having superior non-blocking properties at high temperature and high humidity and comprises water and a selected combination of partially hydrolyzed polyvinyl alcohol and a chemically inert, non-thermoplastic, cold water insoluble, particulate additive which is compatible and dispersible with an aqueous solution of the polyvinyl alcohol.

Remoistenable adhesives are commonly utilized in the production of envelopes, stamps, wallpaper, tapes, labels and similar products wherein it is desired to provide a dry adhesive film which on being moistened with water will become tacky and thereby allow for the ready adhesion to a chosen substrate. In the manufacture of remoistenable adhesive products, typically an aqueous solution or dispersion, or an organic solvent solution of the dry adhesive material is applied as a wet film to a substrate. After the water or organic solvent is removed by drying and evaporation, the resulting dry adhesive film will, on being moistened, produce the desired tacky adhesive surface.

The ability to provide an adhesive which is remoistenable is not in itself difficult and in fact there are a number of known and commercially available products that are used in various applications requiring a remoistenable adhesive. Some of the known remoistenable adhesive formulations include dextrin solutions (dextrin gums); a dextrin solution plus a water based emulsion of polymers such as polyvinyl acetate or ethylene vinyl acetate as disclosed in U.S. Pat. Nos. 4,575,525 issued Mar. 11, 1986 and 4,678,824 issued Jul. 7, 1987; and a polyvinyl alcohol solution combined with an emulsion of polymers such as polyvinyl acetate or ethylene vinyl acetate as shown in U.S. Pat. No. 2,850,468 issued Sep. 2, 1958.

The usefulness of a particular composition as a remoistenable adhesive in a specific application will depend on its ability to meet the many physical and chemical property requirements and to best satisfy the processing conditions to which it is subjected. Accordingly, a remoistenable adhesive composition in addition to providing good adhesion and remoistenability, typically is expected to provide a lay flat or non-curl product, satisfy processing conditions of different manufacturing equipment, provide adequate drying speed, resist hygroscopic blocking and satisfy various other requirements depending on the application involved.

The needs of the various applications requiring the use of a remoistenable adhesive have generally been met by different known formulations, such as noted above, as well as various modifications thereof. However, changing operating equipment and processes and increased customer requirements dictate the need for an improved remoistening adhesive which has desired properties at both high temperature and high humidity. Such a product is especially needed in the manufacture of stamps and envelopes where resistance to hygroscopic blocking and thermoplastic blocking is required under high temperature and high humidity conditions.

SUMMARY OF THE INVENTION

This invention relates to a liquid remoistenable adhesive composition having suitable properties and characteristics at high temperature and high humidity comprising water, a partially hydrolyzed polyvinyl alcohol and a chemically inert, non-thermoplastic, cold water insoluble, particulate additive which is compatible and dispersible with the polyvinyl alcohol in aqueous solution, the alcohol and additive being present in amounts of from about 1:3 to 1:0.5 parts by weight of alcohol to additive, the composition having a viscosity of about 500 to 15,000 cps at 72° F. (22.2° C.) and a solids content of about 30 to 80% and provides resistance to hygroscopic blocking and thermoplastic blocking.

DETAILED DESCRIPTION OF THE INVENTION

The composition of this invention comprising a selected combination of a partially hydrolyzed polyvinyl alcohol and a chemically inert, non-thermoplastic, cold water insoluble, particulate additive provides good adhesion and remoistening ability, has lay flat characteristics and has suitable rheology and other properties to allow it to be processed under conditions wherein satisfactory drying speeds are attained. More significantly, this composition additionally provides resistance to hygroscopic blocking and thermoplastic blocking under conditions of high temperature and high humidity that can often exist during the manufacture, storage, shipping and other handling of products such as stamps and envelopes.

"Blocking" is the undesirable adhesion that can occur between touching layers of a material under certain conditions. Hygroscopic blocking resistance is the ability of the adhesive to resist reactivating due to humidity. In a situation where substrates, such as envelopes or sheets of stamps, are coated with an adhesive which is non-resistant to hygroscopic blocking and are stored and exposed to varying degrees of humidity, there is a tendency for adjacent surfaces of the stacked substrates to adhere and stick to one another.

Thermoplastic blocking is the adhesion that can occur when adhesive coated substrates are exposed to varying amounts of temperature and pressure during processing, storage and other handling operations. Pressure conditions to create blocking can exist, for example, during storage or stacking of products while processing, during the printing of products such as the laserjet printing of papers and envelopes and in perforating sheets of stamps and other products. Depending on the particular conditions used, the amount of pressure that is created can cause blocking in non-resistant adhesive formulations.

Hygroscopic blocking has been more particularly defined by a standard test method, ASTM D 1146-53, wherein hygroscopic blocking is measured on a test specimen at 50 percent relative humidity at 38° C. for 24 hours, and if there is no blocking (free) at increments of successively higher humidities until blocking occurs (critical humidity) or until a suitably high humidity is reached. Thermoplastic blocking has been defined and measured under the same ASTM D 1146-53 procedure at 38° C. for 24 hours and if there is no blocking (free) at successively higher temperatures (increments of 5° C.) until blocking occurs (critical temperature) or until a suitably high temperature is reached. Especially suitable high humidity and high temperature conditions for determining hygroscopic and thermoplastic blocking are 95 percent relative humidity and 90° C.

Another problem often found in the use of remoistenable adhesives is the tendency of coated substrates to curl and buckle. This curling results from the unequal rates of expansion and contraction on the part of the paper backing in relation to the adhesive film as conditions vary, particularly humidity. Excessive curl can cause equipment jam-ups or other handling difficulties. While some adhesive materials have good lay flat or non-curl properties, others require various techniques such as the addition of humectants to overcome or minimize this curling tendency. While these techniques often alleviate the curling problem, other properties such as hygroscopic blocking resistance can be unfavorably affected.

The remoistenable adhesive composition of this invention exhibits a very desirable combination of properties including hygroscopic blocking resistance, thermoplastic blocking resistance and lay flat or non-curl characteristic along with its remoistening capability.

The polyvinyl alcohol component used in this adhesive composition is partially hydrolyzed. Polyvinyl alcohol is a well known, commercially available product prepared by the hydrolysis of polyvinyl acetate. It is typically available in grades defined by the degree of hydrolysis with the "super hydrolyzed" grades having a % hydrolysis (i.e. mole %) of greater than about 99.0, "fully hydrolyzed" grades being about 97.5 to 98.9, "intermediate hydrolyzed" grades from about 95 to 97.5 and "partially hydrolyzed" grades being less than about 95. Partially hydrolyzed polyvinyl alcohol as used in this invention will be a product having a degree of hydrolysis of from about 70 to 92, preferably from about 80 to 90, and more preferably from about 85 to 90%. The viscosity of the polyvinyl alcohol also varies with a useful range being a viscosity in centipoise of a 4% aqueous solution at 20° C. of from about 2 to 50. More particularly, the viscosity of the polyvinyl alcohol will be from about 2 to 30 cps and preferably in the lower range of from about 2 to 8 cps.

While polyvinyl alcohol is a well known adhesive material and has been used in different formulations, the particular composition of this invention where it is specifically combined with a selected additive provides a remoistenable adhesive having especially desirable high temperature and high humidity properties, heretofore not present in such formulations. The additive useful in this composition is a chemically inert, non-thermoplastic, cold water insoluble, particulate material which is compatible and dispersible with an aqueous solution of the polyvinyl alcohol. This additive material must additionally be non-toxic, be combinable with the alcohol in a manner which will provide the composition with a sufficient solids content and viscosity to allow suitable processing conditions and have a sufficiently small particle size so as not to interfere with the processing and application equipment. Most important, this selected additive in combination with the polyvinyl alcohol must enhance the humidity blocking resistance and thermoplastic blocking resistance and provide a lay flat or non-curl characteristic.

The additive material used in this invention is a chemically inert, non-thermoplastic, cold water insoluble, particulate material that is compatible and dispersible with polyvinyl alcohol. Materials of this type include clay, talc, calcium carbonate, gypsum, mica and ungelatinized granular starch with clay and more particularly, kaolin clay, being the preferred additive. The particle size of the additive must be sufficiently small so as not to detrimentally effect the processing and application of the formulation. Generally, a suitable particle size will be less then about 30 microns ($\mu$), preferably less than about 20$\mu$ and more preferably less than about 10$\mu$.

In order to achieve the desired property characteristic, the adhesive composition must have a defined combination of partially hydrolyzed polyvinyl alcohol and additive. More particularly, the polyvinyl alcohol and additive will be present in amounts of from about 1:3 to 1:0.5 parts by weight of alcohol to additive and preferably from about 1:2 to 1:1. The adhesive formulation will have a viscosity range of about 500 to 15,000 cps and preferably about 1000 to 12,000 cps and a solids range of about 30 to 80%, preferably about 40 to 60%.

The viscosity of the adhesive formulation is a Brookfield viscosity determined using Brookfield viscometer model RVT at 20 rpm and 72° F. (22.2° C.).

Generally, the remoistenable adhesive composition will, while maintaining the relationships noted above, comprise about 10 to 50% by weight of partially hydrolyzed polyvinyl alcohol, from about 5 to 40% by weight of selected additive and from about 20 to 85% by weight of water. Preferably from about 12 to 30% by weight of polyvinyl alcohol, from about 20 to 40% by weight of additive and from about 40 to 60% by weight of water will be used.

Some optional ingredients, such as defoamers, plasticizers, lay flat additives etc., may be added to the remoistening adhesive composition to modify certain characteristics thereof, as long as they do not detrimentally affect the hygroscopic and thermoplastic blocking properties. Such ingredients will generally be used in small amounts of less than about 15% by weight and usually in minor amounts of less than about 3% by weight.

The following examples are further illustrative of this invention and are not intended to be construed as limitations thereof. In the examples, all parts and percentages are by weight and all temperatures in degrees Celsius, unless otherwise noted. The viscosity of the adhesive formulation is a Brookfield viscosity, as described previously, determined using Brookfield viscometer model RVT at 20 rpm and 72° F. (22.2° C.). The viscosity of polyvinyl alcohol is measured in a 4% aqueous solution at 20° C.

EXAMPLE I

A remoistenable adhesive composition was prepared by adding 25 parts of partially hydrolyzed polyvinyl alcohol (87.0–89.0% hydrolysis) having a viscosity of 3–4 cps, 25 parts of kaolin clay and 50 parts of water and agitated and heated to obtain a uniform formulation having a solids content of 50.3% and a viscosity of 10,000 cps.

The composition was applied to a paper substrate and an air dried film was obtained in 2 minutes 30 seconds.

The coated sample was tested and found suitable for remoistenability and adhesion and was further tested for hygroscopic blocking and thermoplastic blocking using the procedure of ASTM D 1146-53. Hygroscopic blocking was determined by storing the test specimen for 24 hrs at 95 percent relative humidity at 38° C. (100.4° F.). The sample was free of blocking indicating its resistance to hygroscopic blocking. Thermoplastic blocking was tested by exposing a sample at varying temperatures and a pressure of 65 psi at low humidity for 24 hrs. This sample was free of thermoplastic blocking at a temperature up to 249° C. (475° F.).

showed a very slight pick at about 80° C. (175° F.) and a fiber tear bond at 93.3° C. (200° F.).

TABLE 1

Properties of Remoistening Adhesives

| Adhesive (parts by weight) | Solid Content(%) | Adhesion | Hygroscopic Blocking | Thermoplastic Blocking |
|---|---|---|---|---|
| PV Alcohol/Clay (1:3) | 54.7 | Fiber Tearing Bond | Free | Free at 246° C./65 psi |
| PV Alcohol/Clay (1:2.3) | 54.4 | Fiber Tearing Bond | " | Free at 218° C./65 psi |
| PV Alcohol/Clay (1:1.85) | 51.2 | Fiber Tearing Bond | " | 194.6° C./65 psi |
| PV Alcohol/Clay (1:1.5) | 51.9 | Fiber Tearing Bond | " | 162.8° C./65 psi |
| PV Alcohol/Clay (1:1.2) | 49.5 | Fiber Tearing Bond | " | 162.8° C./65 psi |
| PV Alcohol/Clay (1:1) | 50.3 | Fiber Tearing Bond | " | 148.9° C./65 psi |
| PV Alcohol/PV acetate (comparative) | 51.2 | Fiber Tearing Bond | " | 37.7° C./40 psi |

TABLE 2

Thermoplastic Blocking at Different Temperatures (65 psi)

| Adhesive | Temperature °C. (°F.) | | | | | | | | | | | |
|---|---|---|---|---|---|---|---|---|---|---|---|---|
| | 79.4 (175) | 93.3 (200) | 107.2 (225) | 121.1 (250) | 135 (275) | 148.9 (300) | 162.8 (325) | 176.7 (350) | 190.6 (375) | 204.4 (400) | 218.3 (425) | 232.2 (450) | 246 (475) |
| PV Alcohol/PV Acetate (comparative) | 2 | 5 | 5 | 5 | 5 | 5 | 5 | 5 | 5 | 5 | 5 | 5 | 5 |
| PV Alcohol/Clay (1:3) | — | — | — | — | — | — | — | — | 1 | 2 | 1 | 2 | 2 |
| PV Alcohol/Clay (1:2.3) | — | — | — | 1 | 1 | 2 | 3 | 3 | 3 | 3 | 3 | 3 | 5 |
| PV Alcohol/Clay (1:1.85) | — | 1 | — | 1 | 1 | 3 | 3 | 3 | 4 | 5 | 5 | 5 | 5 |
| PV Alcohol/Clay (1:1.5) | — | — | 1 | 2 | 3 | 3 | 4 | 4 | 5 | 5 | 5 | 5 | 5 |
| PV Alcohol/Clay (1:1.2) | — | — | 1 | 3 | 4 | 4 | 4 | 4 | 5 | 5 | 5 | 5 | 5 |
| PV Alcohol/Clay (1:1) | — | 1 | 1 | 2 | 2 | 4 | 4 | 5 | 5 | 5 | 5 | 5 | 5 |

Code
1 - Tick - No fiber tear          Best
2 - Pick - Very slight, spotty fiber picks   ↓
3 - Sl. Ft. - Slight fiber tear        ↓
4 - Sp. Ft. - Spotty fiber tear        ↓
5 - FTB - Fiber tear bond         Worst

EXAMPLE II

Samples having varying amounts of partially hydrolyzed polyvinyl alcohol (87.0–89.0% hydrolysis) and kaolin clay additive were prepared, tested and compared with a sample standard remoistening adhesive product comprising 80% by weight of polyvinyl acetate emulsion and 15% by weight of polyvinyl alcohol. As indicated in Table 1, all samples provided suitable adhesion and hygroscopic blocking, however, while the polyvinyl/alcohol/clay additive combinations did not exhibit thermoplastic blocking until temperatures of at least about 149° C. (300° F.) at 65 psi, the comparative polyvinyl alcohol/polyvinyl acetate product exhibited thermoplastic blocking at about 38° C. and a pressure of 40 psi.

Similar samples were tested for thermoplastic blocking at different temperatures and 65 psi. As shown in Table 2, the polyvinyl alcohol/clay combinations showed only very slight fiber picks/tears at a temperature of 121° C. (250° F.) and no fiber tear bond until temperatures of at least 176.7° C. (350° F.). The comparative polyvinyl alcohol/polyvinyl acetate adhesive

EXAMPLE III

In order to further show the comparison between standard adhesive products and the remoistenable adhesive compositions of this invention in relation to hygroscopic blocking and thermoplastic blocking, several samples were prepared and tested in accordance with ASTM D 1146-53. Results are shown in Tables 3 and 4.

In Table 3, hygroscopic blocking is given for samples tested at 38° C. for 24 hours at varying relative humidities (48 hours for 95% relative humidity). The degree of blocking is shown in accordance with ASTM D 1146-53 with 3rd degree blocking representing a full bond or adhesion with very severe damage. The polyvinyl alcohol/clay composition exhibited no hygroscopic blocking (free) as compared with the various standard adhesive products which exhibited the degrees of blocking shown.

In Table 4, thermoplastic blocking is given for samples tested in accordance with ASTM D-1146-53 at different temperatures for 24 hours. The degree of blocking is shown with 3rd degree blocking representing a major failure or major fiber tear. The polyvinyl alcohol/clay samples exhibited no thermoplastic blocking (free) while the other comparative adhesive products all had the degree of blocking shown at 121.1° C.

TABLE 3

Hygroscopic Blocking of Remoistening Adhesives

| Adhesive Type | Relative Humidity (%) | | | | | |
|---|---|---|---|---|---|---|
| | 54 | 62 | 75 | 83 | 91 | 95 (48 hrs) |
| Dextrin | Free | Free | 1st Degree | 2nd Degree | 3rd Degree | 3rd Degree |
| PV Acetate/ Dextrin | Free | Free | Free | 1st Degree | 3rd Degree | 3rd Degree |
| PV Acetate PV Alcohol with Plasticizer | Free | 1st Degree | 1st Degree | 1st Degree | 1st Degree | 1st Degree |
| PV Acetate/ PV Alcohol w/o Plasticizer | Free | Free | 1st Degree | 1st Degree | 1st Degree | 1st Degree |
| Dextrin/ PV Acetate (dry gumming type) | Free | Free | 1st Degree | 2nd Degree | 3rd Degree | 3rd Degree |
| PV Alcohol/ Clay (same as Ex I 1:1) | Free | Free | Free | Free | Free | Free |

Code:
Free - no blocking
1st degree - slight clinging/parted with no evidence of damage
2nd degree - some adherence/parted with one surface or other showing some damage.
3rd degree - full bond or adhesion/severe damage.

TABLE 4

Thermoplastic Blocking of Remoistening Adhesives

| Adhesive | Temperatures | | |
|---|---|---|---|
| | 29.4° C. (85° F.) | 65.6° C. (150° F.) | 121.1° C. (250° F.) |
| Dextrin | Free | Free | 2nd degree |
| PV Acetate/Dextrin | Free | Free | 3rd degree |
| PV Acetate/PV Alcohol | Free | Free | 2nd degree |
| PV Alcohol/Clay (sames as Ex. I, 1:1) | Free | Free | Free |

Code:
Free - no blocking
1st degree - slight clinging/parted with no evidence of damage
2nd degree - some adherence/parted with one surface or the other showing some damage.
3rd degree - full bond or adhesion/severe damage.

What is claimed is:

1. A liquid remoistenable adhesive composition having satisfactory properties at high temperatures and high humidity comprising water, a partially hydrolyzed polyvinyl alcohol having a degree of hydrolysis of from about 70 to 92% and a viscosity of a 4% aqueous solution at 20° C. of from about 2 to 50 cps, and a chemically inert, non-thermoplastic, cold water insoluble, particulate additive which is compatible and dispersible with the polyvinyl alcohol in water and wherein the additive is selected from the group consisting of clay, talc, calcium carbonate, gypsum, mica and ungelatinized granular starch, the alcohol and additive being present in an amount of from about 1:3 to 1:0.5 parts by weight of alcohol to additive, the composition having a viscosity of about 500 to 15,000 cps at 72° F. (22.2° C.) and a solids content of about 30 to 80% and provides resistance to hygroscopic blocking and thermoplastic blocking.

2. The composition of claim 1, wherein the additive is clay, and the composition has a viscosity of from about 1000 to 12,000 cps and a solids content of from about 40 to 60%.

3. The composition of claim 2 wherein from about 1:2 to 1:1 parts by weight of alcohol to clay are used.

4. The composition of claim 1, wherein the polyvinyl alcohol has a degree of hydrolysis of from about 80 to 90% and a viscosity of about 2 to 30 cps.

5. The composition of claim 4 wherein the additive is clay and from about 1:2 to 1:1 parts by weight of alcohol to clay are used.

6. The composition of claim 1, wherein the polyvinyl alcohol has a degree of hydrolysis of from about 85 to 90% and a viscosity of about 2 to 8 cps.

7. The composition of claim 6 wherein the composition has a viscosity of from about 1000 to 12,000 cps and a solids content of from about 40 to 60%.

8. The composition of claim 7, wherein the additive is clay.

9. The composition of claim 8, wherein from about 1:2 to 1:1 parts by weight of alcohol to clay are used.

10. The composition of claim 9, wherein the additive is kaolin clay.

* * * * *